Patented Feb. 28, 1928.

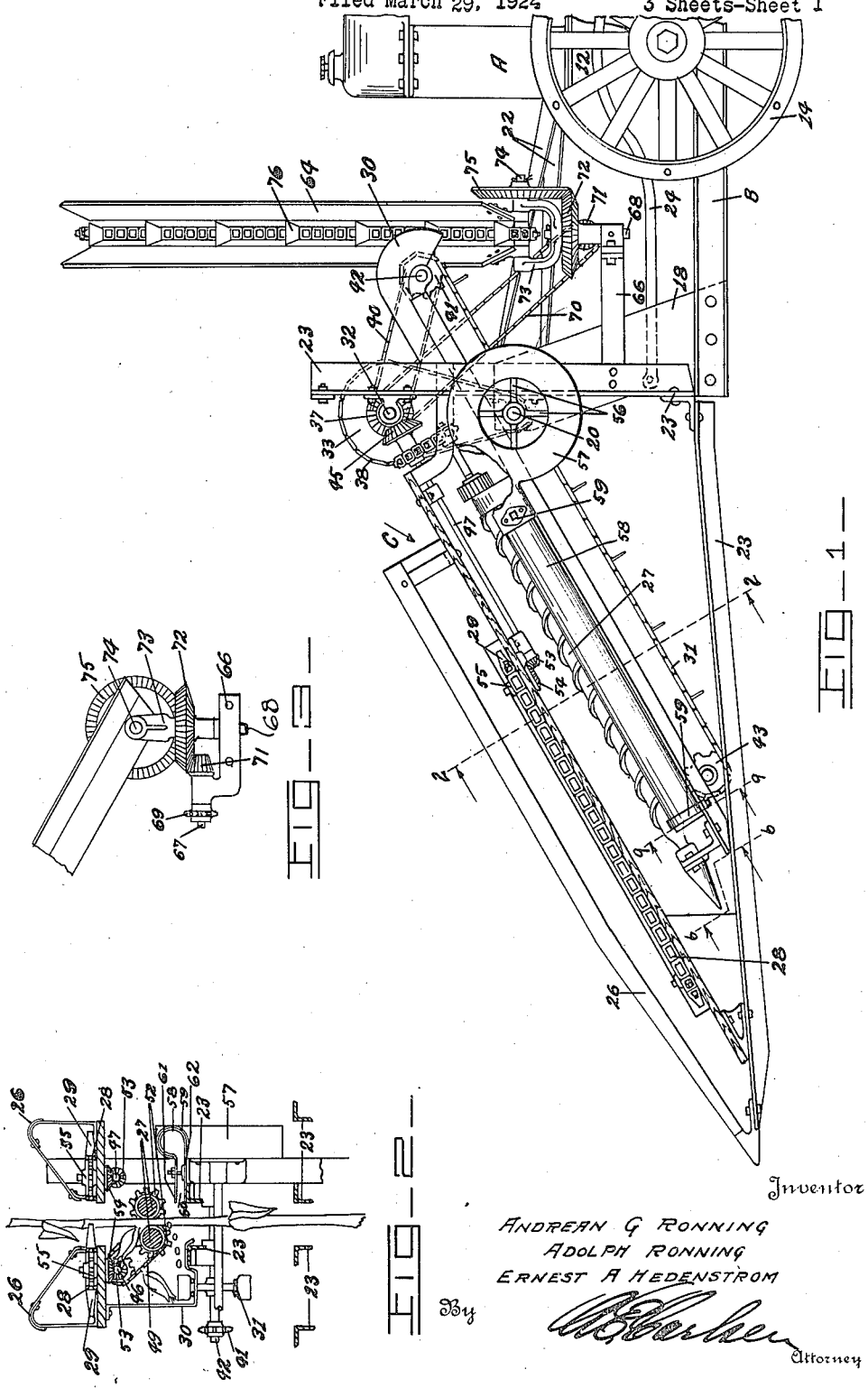

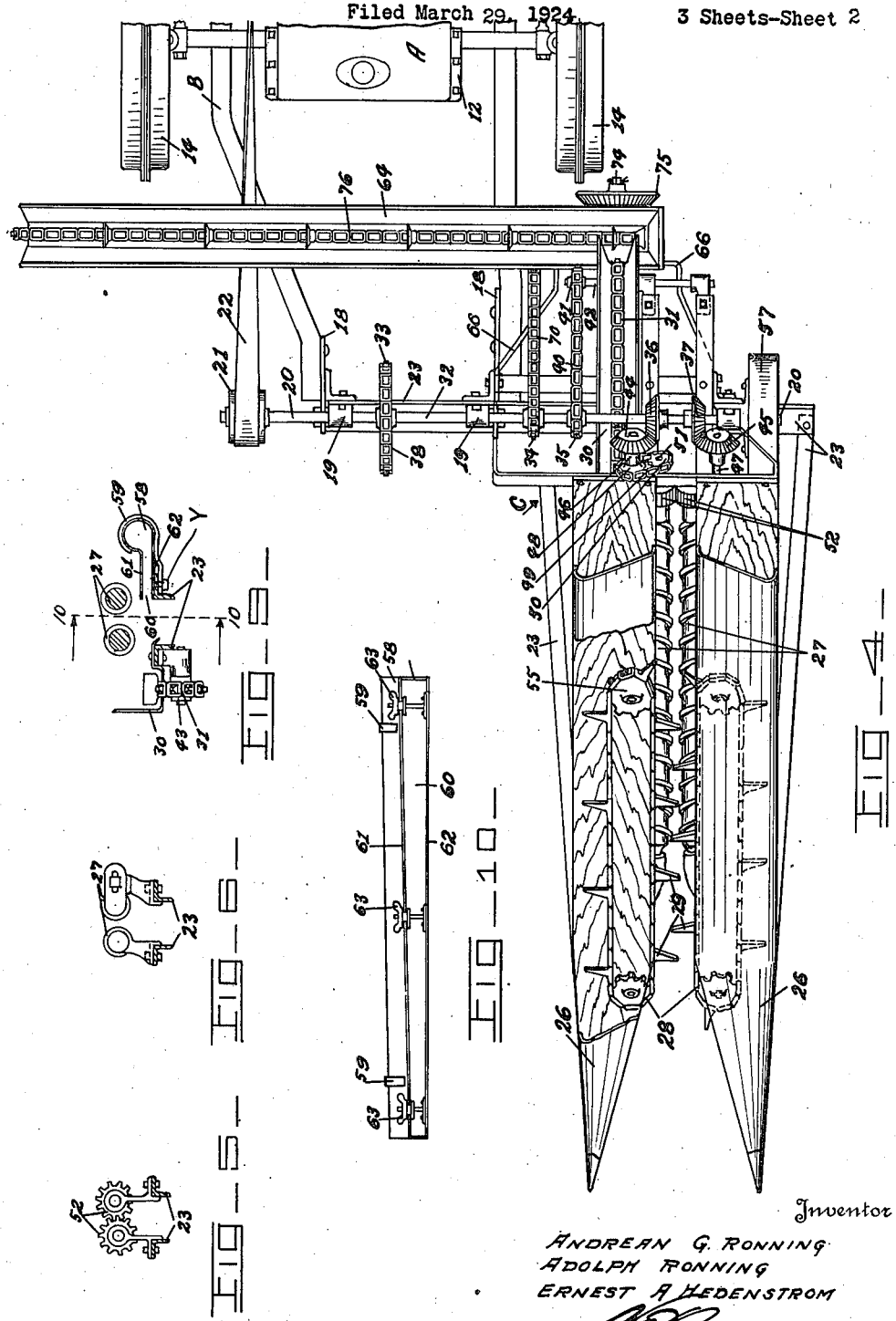

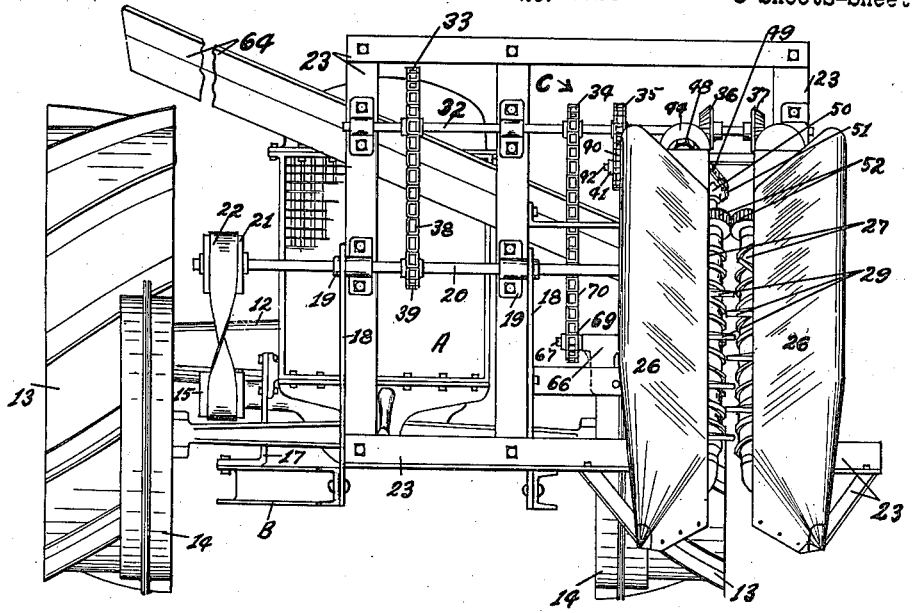
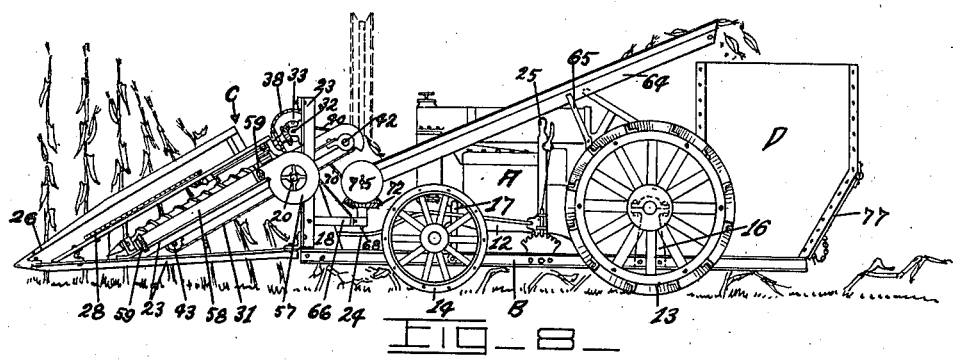

1,660,767

UNITED STATES PATENT OFFICE.

ANDREAN G. RONNING AND ADOLPH RONNING, OF MINNEAPOLIS, AND ERNEST A. HEDENSTROM, OF ST. PAUL, MINNESOTA; SAID HEDENSTROM ASSIGNOR TO SAID ANDREAN G. RONNING AND SAID ADOLPH RONNING; JACOB A. RONNING AND ADOLPH RONNING EXECUTORS OF SAID ANDREAN G. RONNING, DECEASED.

HARVESTING MACHINE.

Application filed March 29, 1924. Serial No. 702,774.

This invention relates to corn harvesting machinery, and the main object is to provide an efficient, practical and highly novel corn harvester adapted to be carried by and adjustably secured to a power unit such as a tractor, and which will remove the ears of corn from the stalks, in advance of the tractor, as the latter progresses, and deliver them, selectively, either to a hopper at the rear of the tractor, or laterally to a wagon or other vehicle drawn along at the side of the tractor. Another object is to provide means of a novel nature for catching and saving kernels of corn which are otherwise lost when the ears are severed from the stalks, thus reducing if not entirely eliminating waste, which, under some circumstances, is often very great. Further and more specific objects will be disclosed in the course of the following specification, reference being had to the accompanying drawings, wherein:

Fig. 1 is a left side elevation of a machine embodying our invention, the rear portion of the tractor unit being broken away.

Fig. 2 is a sectional elevation on the line 2—2 in Fig. 1.

Fig. 3 is a fractional detail view of one of the conveyor driving gear constructions.

Fig. 4 is a top or plan view of the machine as seen in Fig. 1.

Fig. 5 is a detail section showing the pinions of the snapper rollers.

Fig. 6 is a detail section on the line 6—6 in Fig. 1.

Fig. 7 is a front elevation of the machine.

Fig. 8 is a left side view of the entire machine, showing it as in operation in a field.

Fig. 9 is a fractional detail section on the line 9—9 in Fig. 1.

Fig. 10 is a longitudinal detail view of the blower channel when seen as indicated by the line and arrows 10—10 in Fig. 9.

Referring to the drawings more particularly and by reference characters A designates a tractor of common and well known construction having a main frame 12, traction wheels 13, steering wheels 14, and a power transmission pulley 15 (see Fig. 7).

Suitably secured to the tractor, as by braces 16 and 17, (Figs. 7 and 8) is an underslung auxiliary frame B, which extends beyond the ends of the tractor, to support the harvester C at the front end, and a hopper D at the rear end. This frame is preferably arranged below the axles of the tractor wheels, for sake of convenience when attaching it to the tractor, but may extend over the front axle. The front end of the frame B has a pair of upright standards 18 in the upper ends of which are trunnioned a pair of bearing members 19, in which is journaled a main harvester drive shaft 20. This shaft has a pulley 21 which is driven by a belt 22 from the power pulley 15 of the tractor. The combined trunnion and bearing members 19 are secured to and thus tiltably support a harvester frame 23 so that it will swing on an axis concentric with the shaft 20, and its tiltable position is controlled through a connection rod 24 and a hand lever 25 on the tractor and within convenient reach of the tractor operator, (see Figs. 1 and 8).

The harvester consists of a pair of longitudinally spaced gathering frames 26, which are provided with spirally flanged snapping rollers 27, and gathering chains 28 having prongs 29, which, as the harvester is advanced over the row of corn, pull or guide the corn stalks in between the frames and rollers, as shown in the drawings. The rollers first engage the stalks at their lower ends, and, as they advance they also travel up the stalks until the entire length of each stalk has been drawn through between the rollers. The rollers are so designed with respect to each other that they will permit the stalks to pass therebetween but are close enough together so that they will not permit the ears of corn to pass through. Consequently the ears will be pulled off from the stalks, and, as the left roller 27 is slightly higher than the right roller the snapped ears will fall to the right or over the right roller and into a channel member or housing 30 (see Fig. 2), and from which they will be carried by an endless conveyor 31.

The driving mechanism for the elements immediately above described may be set forth as follows: A shaft 32 is journaled in the frame 23, above the shaft 20, and is provided with a sprocket gear 33, sprocket pinions 34 and 35, and a pair of bevel pinions 36, 37. The shaft 32 is driven by a chain 38, which passes over the gear 33 and over a sprocket pinion 39 on the shaft 20. The sprocket pinion 35 is connected by a chain 40 to a sprocket pinion 41 on a shaft 42 which drives the carrier chain 31, the lower end of said chain passing over a pinion 43. The bevel pinions 36 and 37 mesh, respectively, with bevel pinions 44 and 45, on shafts 46 and 47. The shaft 46 has a sprocket pinion 48 which, by a chain 49, drives a pinion 50 on the shaft 51 of one of the snapping rollers 27. These rollers are then simultaneously driven by reason of intermeshing spur gears 52 at their upper ends. The shafts 46 and 47 are provided at their forward or lower ends with bevel pinions 53 which mesh with bevel pinions 54 and thus drive the upper sprocket gears 55 which carry and actuate the gathering chains 28.

Upon the left end of the shaft 20 we mount a rotary or centrifugal fan 56, having a housing 57 which terminates in a cylindrical outlet pipe 58. This pipe is adjustably secured longitudinally with respect to and under the left gathering frame, by clamps or securing devices 59 so that it may be rotatably adjusted or axially tilted. This pipe is provided with a longitudinally extending lateral opening 60 formed by a pair of flanges 61 and 62. These flanges are adjustably arranged with respect to each other by thumb nuts 63, as in Fig. 10, so that the opening 60 may be regulated to adjust the volume and intensity of the blast of air passing out through the opening from the fan. The flanges 61 and 62 are also flexible enough so that the adjusting members 63 may be used to narrow and widen the opening 60 at different places, so that the blast of air may be confined to various heights, as occasion may require.

The blast opening, as indicated, is adjustably arranged in such a manner that it will create a transverse blast of air across and under the snapping rollers and toward the carrier casing 30, as shown in Fig. 2, the purpose being to deflect the kernels of corn that fall from the snapping rollers onto the carrier 31, and thus save them from dropping upon the ground and being lost. It is well known that in corn snappers of this and various other types and designs, and in certain seasons and under various circumstances and conditions, especially when the corn is very dry, as the ears are more or less violently twisted or torn off of the stalks, a considerable amount of the kernels are liberated or loosened, and heretofore have been lost. But with this construction these kernels will be saved and will be carried up by the conveyor 31 together with the ears of corn which are delivered by the snapping rollers.

As all the corn is elevated to the upper end of the carrier 30—31, it drops upon the lower end of an inclined conveyor 64, which may be arranged either transversely, as in Figs. 1, 4 and 7, when the corn is to be delivered into a wagon box at the side of the machine, or it may be extended rearwardly, as in Fig. 8, and supported on a crutch or support 65, so that it will deliver the corn into the hopper D. The driving, tilting and swinging mechanism for the conveyor 64 is shown in Figs. 1, 3, 4 and 8, and may be described as follows: A supporting frame 66 extends rearwardly from the frame 23 and in it are arranged a pair of short shafts 67 and 68. The shaft 67 has a sprocket pinion 69 which is connected by a chain 70 to the pinion 34 on the shaft 32. This shaft 67 also has a bevel pinion 71 which meshes with a bevel gear member 72, rotatable on the shaft 68. A yoke 73 is also rotatably mounted on the shaft 68 and has a transversely journaled shaft 74 which pivotally carries the conveyor 64, and is driven by a bevel gear 75 which meshes with the upper teeth of the gear member 72. Thus the endless carrier 76 of the conveyor boom is kept in motion regardless of the position of the boom.

The hopper D which is arranged to receive the corn when the conveyor is in the rearward postion, is provided at its lower end with a door 77 adapted to be opened when the container is to be emptied.

It is understood that suitable modifications may be made in the general design and structural details of the invention as herein disclosed, provided, however, that such modifications come within the spirit and scope of the appended claims.

Having now therefore fully shown and described our invention what we claim is:

1. The combination in a machine of the character described of snapping devices for removing ears of corn from their stalks, a conveyor arranged laterally with respect to said devices to receive the ears of corn and convey them therefrom, and means for effecting a blast of air transversely under the snapping devices and toward the conveyor, as and for the purpose set forth.

2. The combination including a device for removing ears of corn from their stalks and delivering them to one side thereof, and means for creating a blast of air transversely under the said device and in the direction in which said ears are delivered.

3. In a machine of the class described, a device for removing ears of corn from their stalks, and a blower adapted to create a blast of air transversely under said device.

4. In a machine of the character described, a pair of snapping rollers, a blower housing having an elongated opening arranged parallel with the rollers and substantially therebelow so as to create a blast of air transversely thereunder, and adjusting means for regulating the opening.

5. In a corn harvester, a machine of the character described, corn snapping device, a receptacle at one side thereof to receive corn therefrom, and a blower adapted to direct a blast of air from the other side of the device and transversely with respect thereto toward the receptacle.

6. In a corn harvester, a corn snapping device, a receptacle at one side thereof to receive corn from the device, a blower adapted to direct a blast of air from the other side of the device and transversely with respect thereto toward the receptacle, and means for adjusting the volume and intensity of the blast of air.

7. The combination with a device adapted to act upon ears of corn or the like, of a receiving member, and a blower having an outlet adapted to create a blast transversely of and under the device so as to deflect material, dropping from the device, into the receiving member.

8. In a corn harvester, means including gathering chains for receiving standing stalks and moving them in a standing position rearwardly in the harvester as the harvester moves forwardly, a pair of snapping rollers arranged longitudinally in the harvester for engaging the stalks as they are thus moved rearwardly in the machine, to remove ears therefrom, means for receiving the removed ears, and means for impelling liberated kernels of corn, which fall from between the rollers, into the receiving means.

9. In a corn harvester, means for receiving standing stalks and moving them in a standing position rearwardly in the harvester as the harvester moves forwardly, a pair of snapping rollers arranged longitudinally in the harvester for engaging the stalks, as they are thus moving rearwardly in the harvester, to remove ears therefrom, means, including a trough arranged longitudinally in the harvester, for receiving the removed ears, and means for impelling liberated kernels of corn, which fall from between the rollers, into the receiving means.

10. In a traveling corn harvester, means for receiving stalks in a standing position and moving them rearwardly in the harvester as the latter travels forwardly, inclined rollers arranged longitudinally in the harvester for engaging the standing stalks and removing the ears therefrom as they move rearwardly in the harvester, a trough arranged adjacent to the rollers for receiving ears therefrom, and means for salvaging kernels of corn, which fall from said rollers by impelling them into said trough.

11. In a traveling corn harvester, means for receiving stalks in a standing position and moving them rearwardly in the harvester as the latter travels forwardly, inclined rollers arranged longitudinally in the harvester for engaging the standing stalks and removing the ears therefrom as they move rearwardly in the harvester, a trough arranged adjacent to the rollers for receiving ears therefrom, means for salvaging kernels of corn, which fall from said rollers, by impelling them into said trough, and a conveyor operating in the trough.

12. The combination in a machine of the character described of snapping devices for removing ears of corn from their stalks, a conveyor arranged laterally with respect to said devices to receive the ears of corn and convey them therefrom, and means for effecting a blast of air transversely under the snapping devices and toward the conveyor, said means being adjustable whereby the direction of the blast may be regulated.

13. In a machine of the character described, a pair of snapping rollers, a blower housing having an elongated opening arranged parallel with the rollers and substantially therebelow so as to create a blast of air transversely thereunder, and means for adjustably securing the housing with the opening in angularly adjusted positions.

14. In a machine of the character described, a pair of snapping rollers, a blower housing having an elongated opening arranged parallel with the rollers and therebelow so as to create a blast of air transversely thereunder, and means for selectively adjusting the size of the opening at various points throughout its length.

In testimony whereof we affix our signatures.

ANDREAN G. RONNING.
ADOLPH RONNING.
ERNEST A. HEDENSTROM.